M. H. STEVENSON.
COTTON CHOPPER.
APPLICATION FILED SEPT. 19, 1919.
1,381,028.
Patented June 7, 1921.
2 SHEETS—SHEET 1.
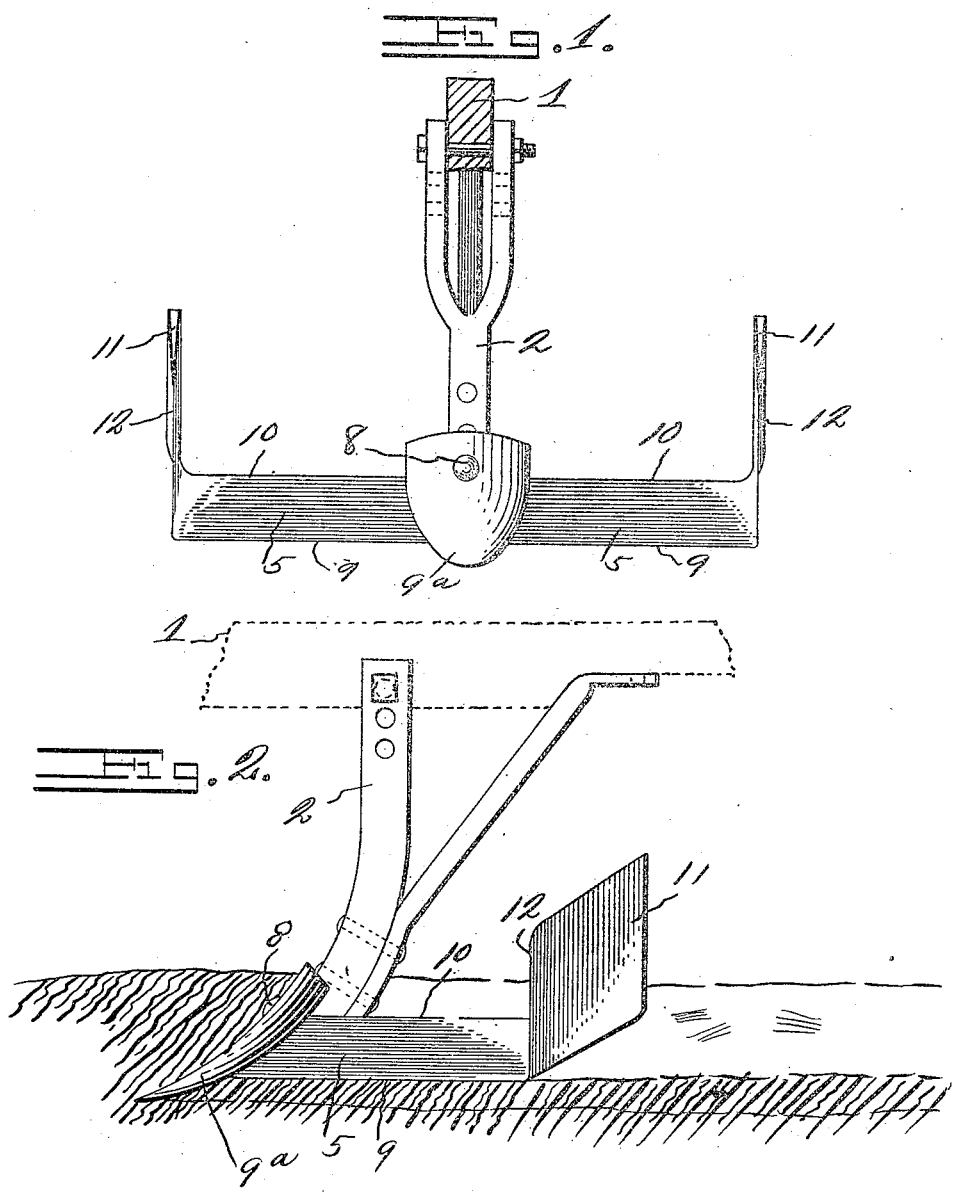
Inventor
M. H. Stevenson
By D. Swift
Attorney M. H. STEVENSON.
COTTON CHOPPER.
APPLICATION FILED SEPT. 19, 1919.
1,381,028.
Patented June 7, 1921.
2 SHEETS—SHEET 2.
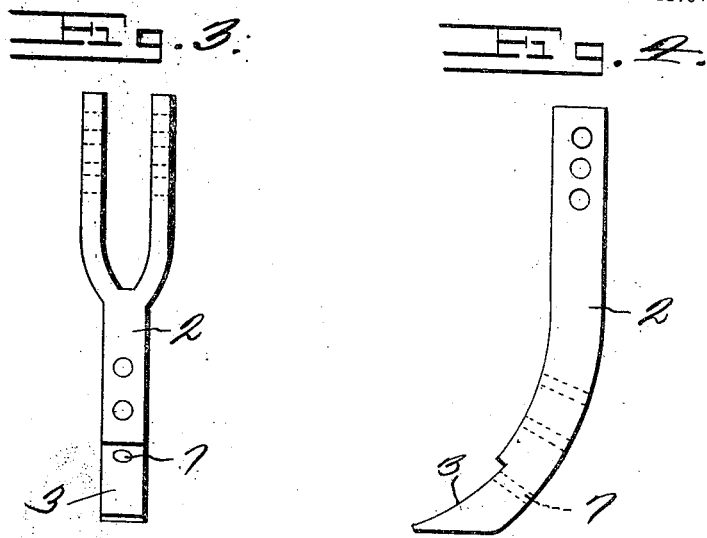
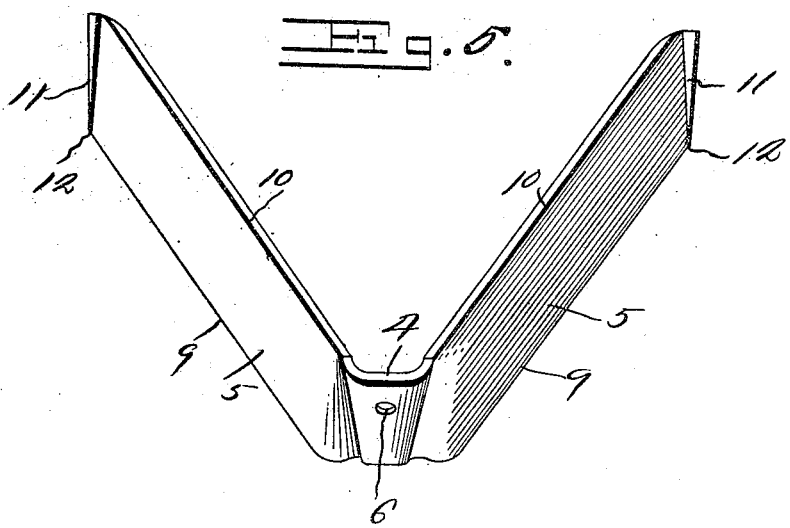
Inventor
M. H. Stevenson
By D. Swift
Attorney

UNITED STATES PATENT OFFICE.

MOSES H. STEVENSON, OF RAYVILLE, LOUISIANA.

COTTON-CHOPPER.

1,381,028.	Specification of Letters Patent.	Patented June 7, 1921.

Application filed September 19, 1919. Serial No. 324,840.

*To all whom it may concern:*

Be it known that I, MOSES H. STEVENSON, a citizen of the United States, residing at Rayville, in the parish of Richland, State of Louisiana, have invented a new and useful Cotton-Chopper; and I do hereby declare the following to be a full, clear, and exact description of the invention, such as will enable others skilled in the art to which it appertains to make and use the same.

The invention relates to cotton choppers and has for its object to provide a cotton chopper which may be attached to any type of sweep stock whereby the chopper as a whole may be moved across adjacent rows of cotton plants so that said cotton plants may be thinned as desired.

A further object is to provide the sweep stock with outwardly and rearwardly extending chopping blades having their forward edges sharpened so as to undermine and destroy the hills of cotton, the outer ends of the horizontally disposed chopper having upwardly extending blades having their forward edges sharpened, said blades forming a guiding means for the horizontal chopper blades and also forming means at each end of the chopper blades as a whole whereby the operator can judge with his eye the depth of the horizontally disposed chopper blades under the ground.

A further object is to provide the chopper and its upwardly extending members in one piece, said chopper being bent so as to form a recess adapted to fit over the forward face of the sweep stock and to form the upwardly extending arms at the ends of the horizontally disposed choppers from the same piece of metal.

With the above and other objects in view the invention resides in the combination and arrangements of parts as hereinafter set forth, shown in the drawings, described and claimed, it being understood that changes in the precise embodiment of the invention may be made within the scope of what is claimed without departing from the spirit of the invention.

In the drawings:—

Figure 1 is a front elevation of the cotton chopper showing the same attached to a sweep stock.

Fig. 2 is a side elevation of the cotton chopper.

Fig. 3 is a detail view of the sweep showing the same in front elevation.

Fig. 4 is a side elevation of the sweep stock.

Fig. 5 is a plan view of the chopper blades.

Referring to the drawings, the numeral 1 designates a plow beam of a wheeled plow or the beam of a drag plow to which animals may be attached and 2 a sweep stock extending downwardly therefrom. The sweep stock extends downwardly and forwardly and has its lower front face cut away at as 3 thereby forming a recess for the reception of the recessed portion 4 of the cotton chopper blades 5. The portion of the cotton chopper blades having the recess 4 is provided with an aperture 6 adapted to register with the aperture 7 in the lower end of the sweep stock so that a bolt 8 may be passed through said apertures and through the plow blade 9$^a$. Chopper blades 5 extend outwardly and rearwardly and are forwardly and downwardly inclined so that their cutting edges 9 are below their rearward edges 10 so that the dirt and plants that are being thinned out will be moved up the inclined surface of the chopper blades 5 thereby destroying the same. The outer ends of the chopper blades 5 are provided with upwardly extending separator blades 11, which blades have their forward edges sharpened as at 12 so that they will easily pass through the ground and forming means for separating the plants when the chopper is moved across the rows. Separators 11 also form means whereby the operator of the plow may at all times know and be able to gage the depth of the chopper blades 5 and also their inclinations.

When it is desired to thin out the cotton plants, the cotton chopper is moved across the rows of cotton and the blades 5 will cut out the plants that are desired to be removed. During the operation the operator may by moving the chopper as a whole from side to side easily guide the separator blades 11 between the plants thereby allowing the uprooting of only those plants that it is desired to move. It will be seen that by providing the plow shovel 9$^a$ that the chopper as a whole will be caused to advance normally in a straight line, also by means of the plow shovel 9$^a$ that the same will form a point on which to swing the chopper blades 5 to either side during the manipulation of the chopper as a whole. By forming the chopper blades 5 integral with the separator blades it will be seen that a cotton chopper blade is provided which may be easily and quickly removed from the sweep stock and one wherein the same may be easily sharpened and cheaply constructed.

The invention having been set forth what is claimed as new and useful is:—

A cotton chopper formed from a single piece of material, said chopper comprising outwardly and rearwardly extending blades, said blades being inclined downwardly and forwardly, a forwardly offset portion U-shaped in horizontal cross section, disposed centrally between the blades, said forwardly offset portion being adapted to receive a sweep stock and engage said stock on each side thereof, an aperture in said forwardly offset U-shaped portion for the reception of a bolt passing through said sweep stock, the ends of the outwardly and rearwardly extending blades being bent upwardly so as to form vertically disposed portions parallel to each other and longitudinally disposed in parallel relation to the longitudinal center line of the plow, and center of the cotton chopper blades, the edges of the vertically disposed portions being provided with vertically disposed cutters which merge into the cutting edges of the outwardly and rearwardly extending blades.

In testimony whereof I have signed my name to this specification in the presence of two subscribing witnesses.

MOSES H. STEVENSON.

Witnesses:
H. S. GALLOWAY,
E. B. LIPSCOMB.